US012771396B2

(12) United States Patent
Singh et al.

(10) Patent No.: US 12,771,396 B2
(45) Date of Patent: Oct. 20, 2026

(54) DIFFERENTIATING PHYSICAL RADIATION PATTERNS IN PASSIVE METASURFACES

(71) Applicant: Dell Products L.P., Round Rock, TX (US)

(72) Inventors: Tejinder Singh, Manotick (CA); Navjot Kaur Khaira, Manotick (CA)

(73) Assignee: Dell Products L.P., Round Rock, TX (US)

(*) Notice: Subject to any disclaimer, the term of this patent is extended or adjusted under 35 U.S.C. 154(b) by 35 days.

(21) Appl. No.: 18/775,993

(22) Filed: Jul. 17, 2024

(65) Prior Publication Data

US 2026/0025161 A1 Jan. 22, 2026

(51) Int. Cl.

| | |
|---|---|
| ***H04B 1/3827*** | (2015.01) |
| ***G01S 5/02*** | (2010.01) |
| ***G02B 1/00*** | (2006.01) |

(52) U.S. Cl.

CPC ............ *H04B 1/385* (2013.01); *G01S 5/0252* (2013.01); *G02B 1/002* (2013.01)

(58) Field of Classification Search

None

See application file for complete search history.

(56) References Cited

U.S. PATENT DOCUMENTS

| | | | |
|---|---|---|---|
| 2,648,839 | A | 8/1953 | Ford et al. |
| 2,894,261 | A | 7/1959 | Yaru |
| 2,981,949 | A | 4/1961 | Elliott |
| 3,218,644 | A | 11/1965 | Berry |
| 3,308,467 | A | 3/1967 | Morrison, Jr. |

(Continued)

FOREIGN PATENT DOCUMENTS

| | | | | |
|---|---|---|---|---|
| CN | 114168014 A | 3/2022 | | |
| CN | 117044035 A | * | 11/2023 | H01Q 1/273 |
| EP | 2495621 A1 | * | 9/2012 | G04G 21/04 |

OTHER PUBLICATIONS

Office Action mailed Dec. 10, 2025 for U.S. Appl. No. 18/775,968, 34 pages.

(Continued)

*Primary Examiner* — Dameon E Levi
*Assistant Examiner* — Anh Ho
(74) *Attorney, Agent, or Firm* — Amin, Turocy & Watson, LLP

(57) ABSTRACT

The technology described herein is directed towards a wearable device that includes a passive metasurface of unit cells with a distinct signature corresponding to a physical radiation pattern of signals reflected by the metasurface. The distinct signature facilitates security and privacy, such as to allow access to a device, system and/or user account. The metasurface interacts with a transceiver coupled to a computing device. The transceiver transmits a wireless radio frequency signal towards the metasurface, whereby the metasurface reflects an altered instance of the incoming signal back to the transceiver. The radiation pattern of the reflected signal is distinct per metasurface, providing a signature of that particular metasurface. When activated, the receipt of an expected, matched signal's signature at the computing device, can, for example, facilitate proximity detection of the user and/or authentication of the user. Various wearable designs can incorporate the metasurfaces.

20 Claims, 14 Drawing Sheets

(56) References Cited

U.S. PATENT DOCUMENTS

| | | | |
|---|---|---|---|
| 4,518,967 | A | 5/1985 | Westerman |
| 5,579,019 | A | 11/1996 | Uematsu et al. |
| 10,038,690 | B2 | 7/2018 | Andrews et al. |
| 10,193,880 | B1 | 1/2019 | Jiang et al. |
| 10,497,227 | B2 | 12/2019 | Bilal et al. |
| 10,701,067 | B1 | 6/2020 | Ziraknejad et al. |
| 11,042,613 | B2 | 6/2021 | Deole et al. |
| 11,074,488 | B2 | 7/2021 | Klimt |
| 11,340,392 | B1 | 5/2022 | Wollack et al. |
| 11,393,037 | B1 | 7/2022 | Fields et al. |
| 11,461,687 | B1 | 10/2022 | Shaikh et al. |
| 11,757,165 | B2 | 9/2023 | Shi |
| 11,949,673 | B1 | 4/2024 | Sanchez |
| 12,225,026 | B1 | 2/2025 | Zhou et al. |
| 12,260,077 | B1 | 3/2025 | V et al. |
| 12,407,681 | B2 | 9/2025 | Young et al. |
| 2001/0017603 | A1 | 8/2001 | Teshirogi et al. |
| 2003/0098815 | A1 | 5/2003 | Teshirogi et al. |
| 2005/0038994 | A1 | 2/2005 | Johnson et al. |
| 2006/0097942 | A1 | 5/2006 | Tanaka et al. |
| 2007/0091004 | A1 | 4/2007 | Puuri |
| 2011/0209372 | A1 | 9/2011 | Padgett et al. |
| 2012/0056776 | A1 | 3/2012 | Shijo et al. |
| 2012/0306711 | A1 | 12/2012 | Asplund et al. |
| 2015/0035643 | A1 | 2/2015 | Kursun |
| 2015/0109106 | A1 | 4/2015 | Gomez et al. |
| 2015/0147065 | A1 | 5/2015 | Civelli et al. |
| 2015/0222023 | A1 | 8/2015 | Shijo et al. |
| 2016/0028715 | A1 | 1/2016 | Sivashanmugam et al. |
| 2016/0254396 | A1 | 9/2016 | Casse |
| 2019/0132399 | A1 | 5/2019 | Henning et al. |
| 2019/0379120 | A1 | 12/2019 | Manasson et al. |
| 2020/0005113 | A1 | 1/2020 | Schnippering |
| 2020/0012912 | A1 | 1/2020 | Klimt |
| 2020/0042977 | A1 | 2/2020 | Boulby |
| 2020/0294642 | A1 | 9/2020 | Bostic et al. |
| 2020/0403647 | A1 | 12/2020 | Bit-Babik et al. |
| 2021/0028528 | A1 | 1/2021 | Alexanian et al. |
| 2021/0258314 | A1 | 8/2021 | Tabaja |
| 2022/0012336 | A1 | 1/2022 | Lakkundi et al. |
| 2022/0078762 | A1 | 3/2022 | Machado et al. |
| 2022/0085841 | A1 | 3/2022 | Grétarsson et al. |
| 2022/0413587 | A1 | 12/2022 | Lagnado et al. |
| 2023/0155812 | A1 | 5/2023 | Bennison |
| 2023/0344136 | A1 | 10/2023 | Liu et al. |
| 2023/0386245 | A1 | 11/2023 | Tada |
| 2024/0214967 | A1* | 6/2024 | Zorgui .................. H04L 5/0048 |
| 2024/0248366 | A1 | 7/2024 | Cho et al. |
| 2024/0250445 | A1 | 7/2024 | Sano |
| 2024/0310561 | A1 | 9/2024 | Allen et al. |
| 2024/0387998 | A1 | 11/2024 | Wong et al. |
| 2024/0393433 | A1* | 11/2024 | Elian ........................ G01S 7/412 |
| 2024/0402342 | A1 | 12/2024 | Knapp et al. |
| 2024/0406752 | A1 | 12/2024 | Coskun et al. |
| 2025/0078593 | A1 | 3/2025 | Beuchat et al. |
| 2025/0309943 | A1* | 10/2025 | Elshafie ............. G06K 7/10366 |
| 2025/0372886 | A1 | 12/2025 | Wada et al. |
| 2026/0025172 | A1 | 1/2026 | Singh et al. |

OTHER PUBLICATIONS

Notice of Allowance mailed Oct. 21, 2025 for U.S. Appl. No. 18/776,007, 43 pages.
Notice of Allowance mailed Oct. 24, 2025 for U.S. Appl. No. 18/776,018, 40 pages.
Office Action mailed Dec. 10, 2025 for U.S. Appl. No. 18/775,984, 28 pages.
Notice of Allowance mailed Mar. 21, 2025 for U.S. Appl. No. 18/780,245, 25 pages.
Singh, et al. "Passive Wearable Device for Security and Authentication" U.S. Appl. No. 18/775,968, filed Jul. 17, 2024, 39 pages.
Singh, et al. "Scalable and Compact Metasurface Design for Smart and Functional Wearable Devices" U.S. Appl. No. 18/775,979, filed Jul. 17, 2024, 39 pages.
Singh, et al. "Integrated Physical Device Identification for Remote Management of Wearable Metasurfaces" U.S. Appl. No. 18/775,984, filed Jul. 17, 2024, 41 pages.
Singh, et al. "Customization and Appearance Information for Wearable Metasurfaces" U.S. Appl. No. 18/775,999, filed Jul. 17, 2024, 41 pages.
Singh, et al. "Computer Peripheral With Embedded Transceiver for Proximity Detection of Wearable Metasurfaces" U.S. Appl. No. 18/776,001, filed Jul. 17, 2024, 40 pages.
Singh, et al. "Proximity Based Multifactor Authentication Using Passive Wearable Metasurfaces" U.S. Appl. No. 18/776,007, filed Jul. 17, 2024, 46 pages.
Singh, et al. "Automatic Computing Device Wake up and Lock Using Passive Wearable Metasurface" U.S. Appl. No. 18/776,011, filed Jul. 17, 2024, 45 pages.
Singh, et al. "Software Stack and Backend for Passive Wearable Metasurfaces for Remote Management and Analytics" U.S. Appl. No. 18/776,018, filed Jul. 17, 2024, 50 pages.
Singh, et al. "Activation and Deactivation Detection for a Passive Wearable Metasurface Using a Segmented Ground Plane" U.S. Appl. No. 18/780,245, filed Jul. 22, 2024, 42 pages.
Singh, et al. "Design and Deployment of a Wearable Metasurface With a Segmented Ground Plane" U.S. Appl. No. 18/780,263, filed Jul. 22, 2024, 39 pages.
Singh, et al. "Compact Transceiver With Advanced Beam-Scanning Functionality Based on Leaky Wave Antenna" U.S. Appl. No. 18/780,280, filed Jul. 22, 2024, 37 pages.
Singh, et al. "Aperture Reconfiguration for Transceiver With Beam-Scanning Capability" U.S. Appl. No. 18/780,284, filed Jul. 22, 2024, 37 pages.
"Introducing the New Oura Ring Generation 3" Oura. [https://ouraring.com/blog/oura-generation2-vs-generation3/], retrieved Jul. 3, 2025, 3 pages.
"Galaxy Ring—Galaxy AI is here" Samsung. [https://www.samsung.com/us/rings/galaxy-ring/?msockid=2bb734e76e306246380e20d36f0b63d2], retrieved Jul. 3, 2025, 19 pages.
Singh, et al. "Utilizing Passive Wearable Devices to Capture Device Interaction Data for Supplementary Authentication" U.S. Appl. No. 19/030,562, filed Jan. 17, 2025, 53 pages.
Singh, et al. "Long-Term Pattern Recognition Using Proximity Detection for Security Applications" U.S. Appl. No. 19/056,466, filed Feb. 18, 2025, 49 pages.
Singh, et al. "User Authentication in Computer Devices Through Statistical Analysis of Gesture Data" U.S. Appl. No. 19/170,829, filed Apr. 4, 2025, 40 pages.
Office Action mailed Jun. 3, 2026 for U.S. Appl. No. 19/056,466, 33 pages.
Notice of Allowance received for U.S. Appl. No. 18/775,984 dated Mar. 25, 2026, 6 pages.
Non-Final Office Action received for U.S. Appl. No. 18/775,999 dated Mar. 23, 2026, 36 pages.
Non-Final Office Action received for U.S. Appl. No. 18/780,280 dated Mar. 11, 2026, 12 pages.
Notice of Allowance received for U.S. Appl. No. 18/775,968 dated Apr. 7, 2026, 6 pages.
Corrected Notice of Allowability mailed May 6, 2026 for U.S. Appl. No. 18/775,968, 41 pages.
Office Action mailed Jun. 29, 2026 for U.S. Appl. No. 18/776,011, 68 pages.
Notice of Allowance mailed Jul. 2, 2026 for U.S. Appl. No. 18/780,280, 85 pages.
Notice of Allowance mailed Jun. 30, 2026 for U.S. Appl. No. 19/030,562, 43 pages.
Notice of Allowance mailed Jun. 30, 2026 for U.S. Appl. No. 19/056,466, 69 pages.
Notice of Allowance mailed Jul. 16, 2026 for U.S. Appl. No. 18/780,263, 50 pages.
Notice of Allowance mailed Jul. 7, 2026 for U.S. Appl. No. 19/170,829, 86 pages.

(56) References Cited

OTHER PUBLICATIONS

Cao, H., Liu, D., Jiang, H., Wang, R., Chen, Z. and Xiong, J., 2023. "LIPAuth: Hand-dependent light intensity patterns for resilient user authentication". ACM Transactions on Sensor Networks, 19(3), pp. 1-29. (Year: 2023).

Ohtsuki, T. and Kamai, H., 2016, September. "Biometric authentication using hand movement information from wrist-worn PPG sensors". In 2016 IEEE 27th Annual International Symposium on Personal, Indoor, and Mobile Radio Communications (PIMRC) (pp. 1-5). IEEE. (Year: 2016).

* cited by examiner

DIFFERENTIATING PHYSICAL RADIATION PATTERNS IN PASSIVE METASURFACES

RELATED APPLICATIONS

The subject patent application is related to U.S. patent application Ser. No. 18/775,968, filed Jul. 17, 2024, and entitled "PASSIVE WEARABLE DEVICE FOR SECURITY AND AUTHENTICATION", U.S. patent application Ser. No. 18/775,979, filed Jul. 17, 2024, and entitled "SCALABLE AND COMPACT METASURFACE DESIGN FOR SMART AND FUNCTIONAL WEARABLE DEVICES", U.S. patent application Ser. No. 18/775,984, filed Jul. 17, 2024, and entitled "INTEGRATED PHYSICAL DEVICE IDENTIFICATION FOR REMOTE MANAGEMENT OF WEARABLE METASURFACES", U.S. patent application Ser. No. 18/775,999, filed Jul. 17, 2024, and entitled "CUSTOMIZATION AND APPEARANCE INFORMATION FOR WEARABLE METASURFACES", U.S. patent application Ser. No. 18/776,001, filed Jul. 17, 2024, and entitled "COMPUTER PERIPHERAL WITH EMBEDDED TRANSCEIVER FOR PROXIMITY DETECTION OF WEARABLE METASURFACES", U.S. patent application Ser. No. 18/776,007, filed Jul. 17, 2024, and entitled "PROXIMITY BASED MULTIFACTOR AUTHENTICATION USING PASSIVE WEARABLE METASURFACES", U.S. patent application Ser. No. 18/776,011, filed Jul. 17, 2024, and entitled "AUTOMATIC COMPUTING DEVICE WAKE UP AND LOCK USING PASSIVE WEARABLE METASURFACE", and U.S. patent application Ser. No. 18/776,018, filed Jul. 17, 2024, and entitled "SOFTWARE STACK AND BACKEND FOR PASSIVE WEARABLE METASURFACES FOR REMOTE MANAGEMENT AND ANALYTICS", the entireties of which patent applications are hereby incorporated by reference herein.

BACKGROUND

Existing wearable devices such as rings and wristwatches for activity tracking and/or health monitoring operate by establishing a communication link between the wearable device and a transceiver, generally using BLUETOOTH low energy technology. As such, these devices need electrical components such as a battery, various sensors, circuits, a controller, and antennas within the device, increasing the cost, size, and complexity in design. Moreover, due to the smaller battery size, these wearable devices need to be charged frequently.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1A:
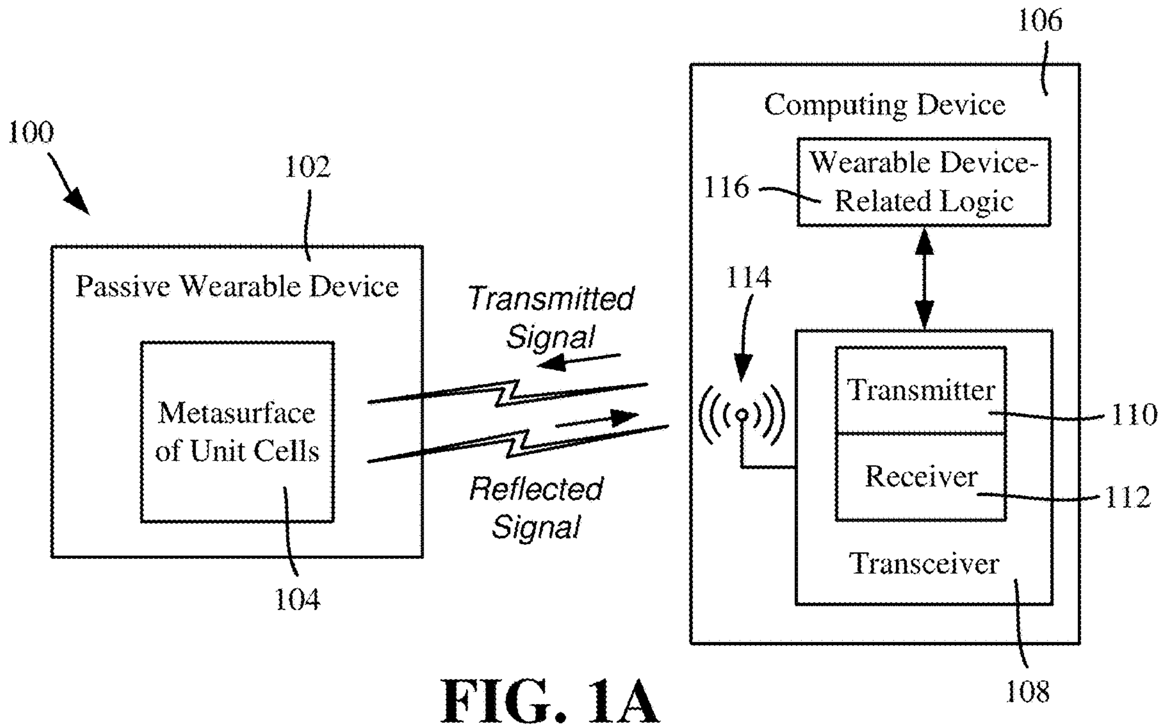
FIG. 1A is a block diagram representation of an example wearable device including a passive metasurface communicating with a computing device via an embedded transceiver, in accordance with various example embodiments and implementations of the subject disclosure.

The technology described herein is generally directed towards a wearable or otherwise portable metasurface that is capable of interacting with a receiver connected to a computing device, such as a personal computer or laptop. The metasurface includes unit cells that are distinctly identifiable based on customized physical radiation characteristics relative to other metasurfaces.

In one implementation, the receiver is part of a dedicated transceiver that can be embedded into or otherwise coupled to the computing device. The transceiver, serving as the system's active component, emits a wireless radio frequency signal towards a metasurface integrated into the wearable device. Upon receiving the signal, the metasurface alters the incoming signal's properties in a predefined manner, based on the distinctly identifiable unit cells that alter the physical radiation pattern, and redirects (reflects) the altered instance of the signal back to the transceiver.

Each metasurface thus generates a distinct radiation pattern, which not only differentiates each metasurface from others but also ensures that each metasurface can uniquely interact with a corresponding system. The distinct radiation pattern can correspond to a service tag encoding for individual metasurface identification, which can include information such as appearance, materials, location, antenna patterns, beam splitting nature, range, and the like.

When activated with respect to a device, the metasurface can be used with the transceiver for detecting the proximity of the user, as well as possibly other actions such as authenticating the user, providing a seamless and intuitive user experience that is both efficient and secure. For example, the computing device, which can maintain a data store or one or more metasurface IDs that are valid on that computing device, can wake up or lock based on the presence or absence of the authenticated user, respectively. The metasurface can be deactivated with respect to the device (and any other device), e.g., if lost.

The wearable device embedded with a metasurface or with a metasurface affixed thereto, can become a component in a user's daily attire, for example. Significantly, the wearable device and metasurface can be passive, requiring no internal or external power source to operate as a reflecting device.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in RF communications and RF devices in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation.

Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1A is a block diagram representation of one example implementation of a system 100 in which a wearable device 102, which includes a metasurface of unit cells 104, communicates with a computing device 106. In the example of FIG. 1A, the computing device 106 includes an embedded, integrated or otherwise internal transceiver 108, which in turn includes a transmitter 110 and receiver 112. The transceiver components are coupled to an antenna 114 that transmits signals to the metasurface 104 of the passive wearable device 102, which as described herein, alters a reflected instance of the signal's characteristics to the transceiver's receiver 112. Based on the received signal, wearable device-related logic 116 (e.g., a hardware or software program running in the computing device 106) can analyze the reflected signal and take some action based thereon as described herein, such as to wake the operating system program or the like for execution in the computing device. A data store or the like that maintains distinct identifier(s) of valid metasurface(s) by which access to this computing device 106 is allowed can be part of the wearable device-related logic 116, although a separate data store accessible by the wearable device-related logic 116 can be maintained if a large number of such IDs are maintained for a device, such as a shared workstation.

Figure 1B:
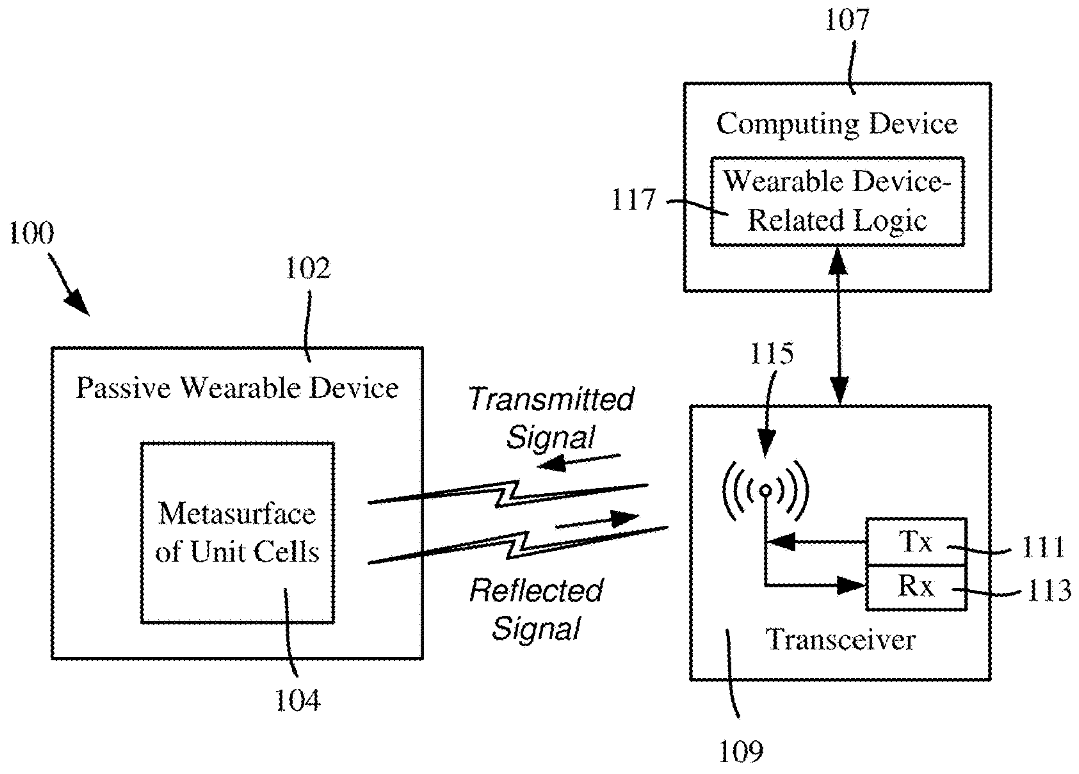
FIG. 1B is a block diagram representation of an example wearable device including a passive metasurface communicating with a computing device via an external transceiver, in accordance with various example embodiments and implementations of the subject disclosure.

FIG. 1B is similar to FIG. 1A, except that a transceiver 109 (transmitter Tx 111/receiver Rx 113) is external to the computing device 107. For example, the external transceiver 109 can be designed as a universal serial bus (USB) device or other suitable device that plugs into a port of the computing device 109. Alternatively, the external transceiver 109 can be embedded into a computer peripheral, such as a mouse, keyboard or monitor.

While a dedicated transceiver is one practical and convenient example, it should be noted that the transmitter and the receiver can be separate components. For example, consider an office setting where a single wall-mounted transmitter can transmit signals to multiple user work locations. Each user can share the same transmitter, yet have his or her own passive wearable device that reflects from the transmitter to a receiver. The users' respective computing devices can have respective external or internal receivers.

Figure 2:
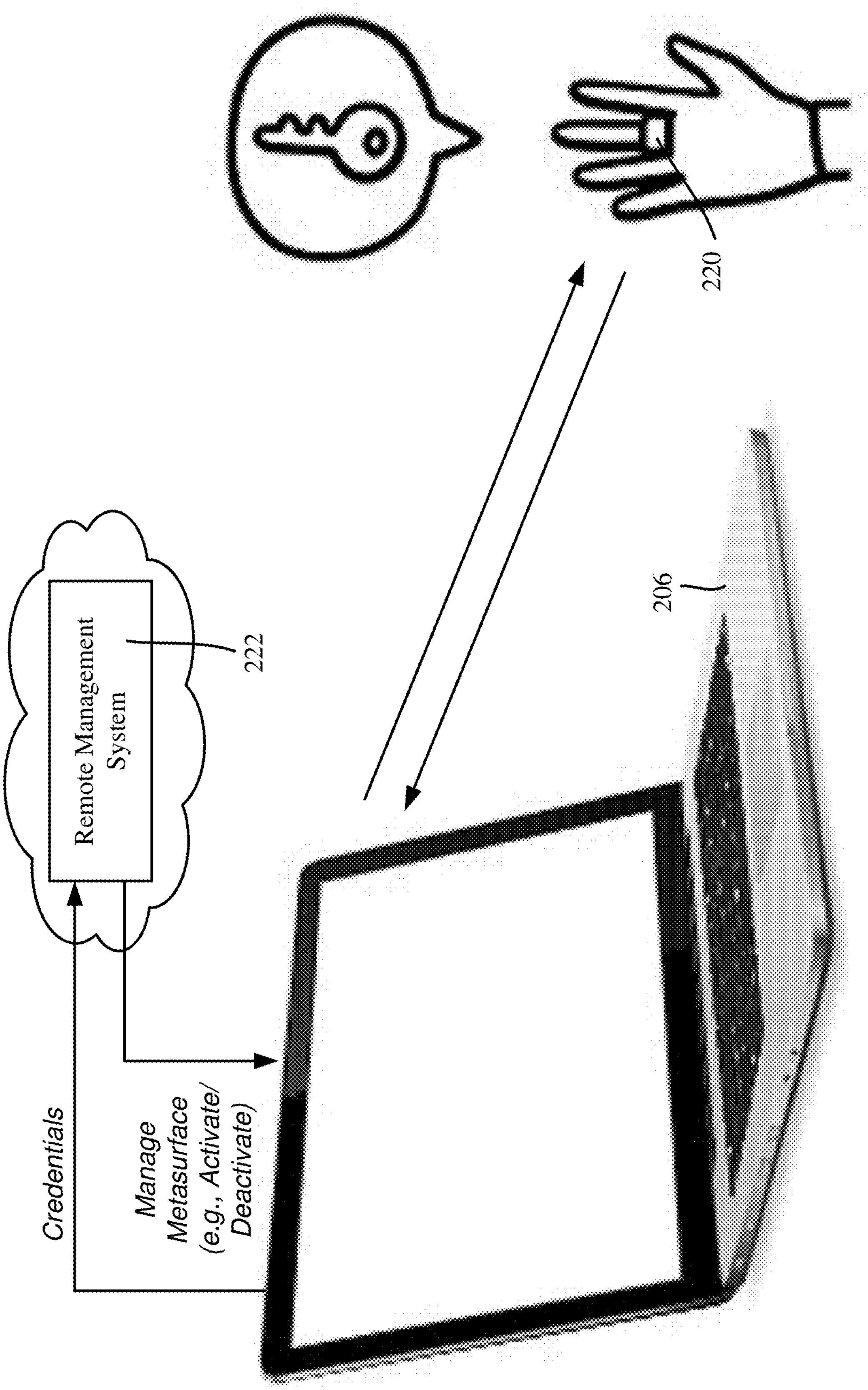
FIG. 2 is a representation of an example wearable device in the form of a ring design, in which the wearable device includes a passive metasurface that acts as a security/authentication key with respect to a computing device, in accordance with various example embodiments and implementations of the subject disclosure.
Figure 3:
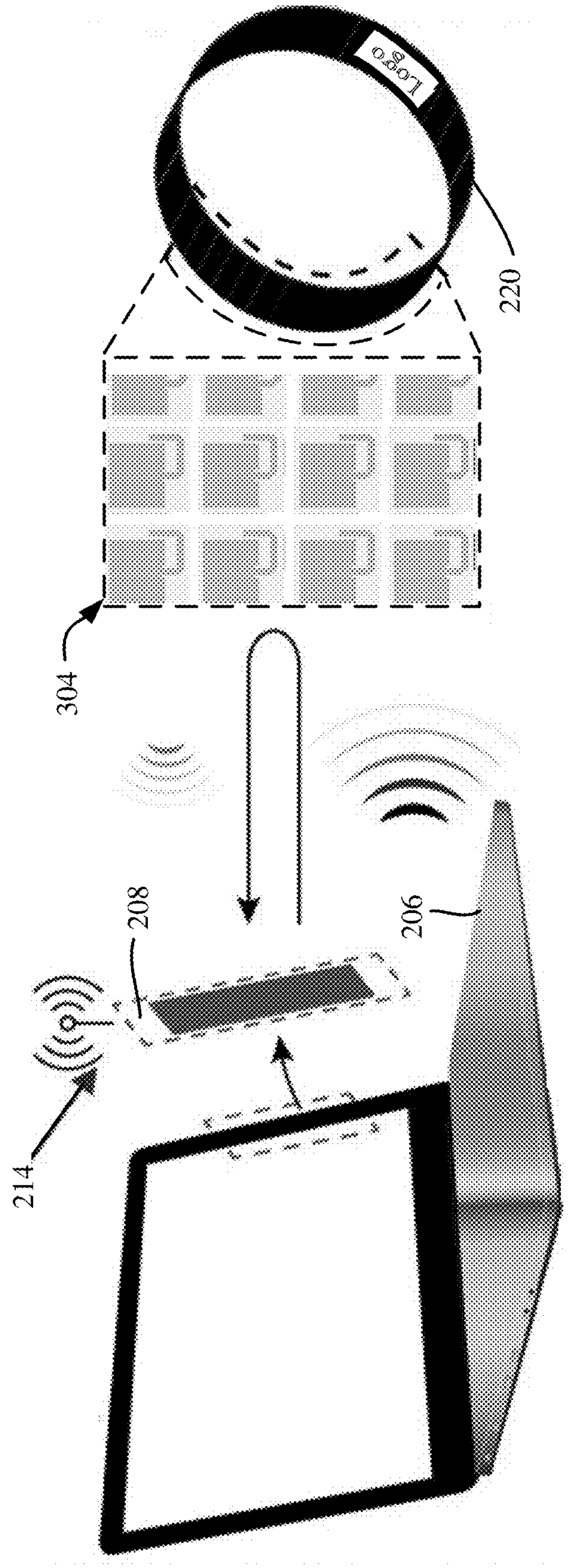
FIG. 3 is a representation of an example wearable device in the form of a ring design, highlighting the passive metasurface communicating with a transceiver embedded in a computing device, in accordance with various example embodiments and implementations of the subject disclosure.

FIGS. 2 and 3 show the general concept of a ring-based wearable metasurface 220 interacting with a laptop computer 206. The ring-based wearable metasurface 220 can act as a key to lock and unlock the computer 206, for example, or at least detect the user's presence to wake the computer 206, such as to automatically open present an interactive lock screen when proximity is detected.

Initially, the ring-based wearable metasurface 220 may need to be initially activated or reactivated with respect to the particular device 206, and/or an account, such as an account that is accessed via the device 206. To this end, a user or administrator sends credentials to a remote management system 222 that ensures that the metasurface 220 has not previously been permanently deactivated, and if not, informs the device 206 (or an account) that the metasurface 220 is now active for interacting with the device. Note that once activated, the remote management system need not be accessed further with respect to the particular device 206, as the signals reflected by the metasurface 220 now have a distinctly recognizable signature that allows access to the device. The distinct radiation pattern (signature/service tag) of the ring-based wearable metasurface 220 thus serves as an access key.

The remote management system maintains an association between the metasurface signature (e.g., service tag) and the credentials. In the event that the metasurface 220 is misplaced, lost or otherwise needs to be disabled (e.g., a former employee has a company-owned ring), the metasurface 220 can be deactivated through the maintained credentials. Deactivation can be permanent, or can be temporary, e.g., the metasurface 220 can be suspended with respect to the device 206/account, and reactivated via the credentials if found or transferred to another user or another device. Information about the device 206 also can be maintained by the remote management system 222. For example, the remote management system 222 can maintain statistics or other data as to metasurface-to-device access patterns, usage, and so forth, e.g., for analysis by the metasurface's owner.

In the example of FIG. 3, a portion of the metasurface unit cells 304 is shown enlarged and interacting with a transceiver 208 (via antenna 214) integrated into the bezel or the like of the computer 206. In general, the user only needs to orient his or her hand at a reasonably close and suitable reflecting angle for the system to operate. Instead of the bezel, the transceiver 208 (or the antenna 214 coupled thereto) can be embedded into the lower portion of the laptop so that when interacting with the keyboard/mouse pad, the user's ring is naturally angled downward in a direction generally towards the antenna.

Figure 4:
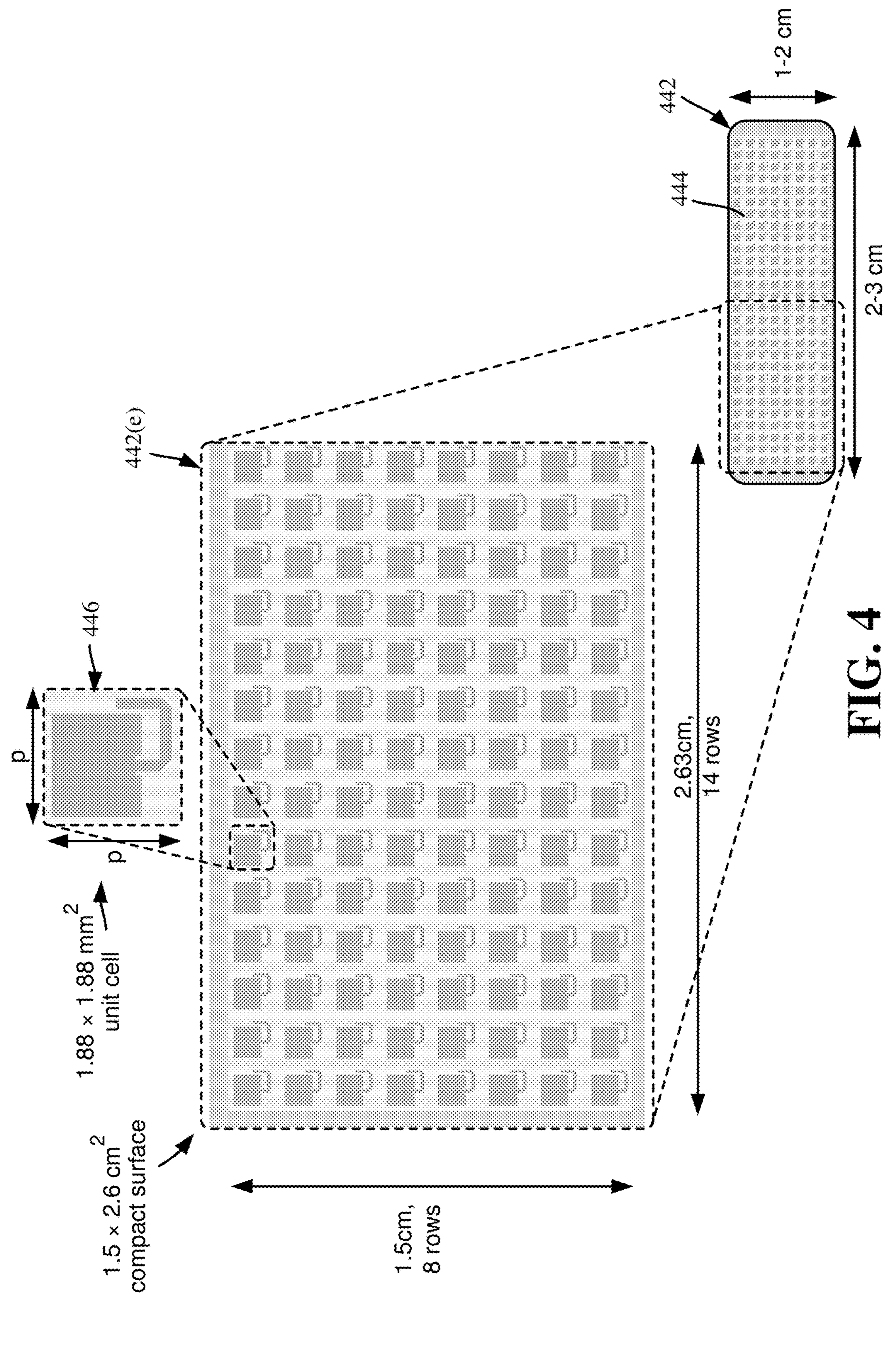
FIG. 4 is a representation of an example surface designed for being implemented at 80 GHz, demonstrating the metasurface's compact and planar features, along with an enlarged portion representation thereof, and an enlarged unit cell representation, in accordance with various example embodiments and implementations of the subject disclosure.

FIG. 4 shows an example wearable device 442 that incorporates a metasurface 444 with an 8×28 array of unit cells. An enlarged portion 442(*e*) highlighting an 8×14 unit cell array of the metasurface 444 is shown, and one of the unit cells 446 is enlarged.

Figure 5:
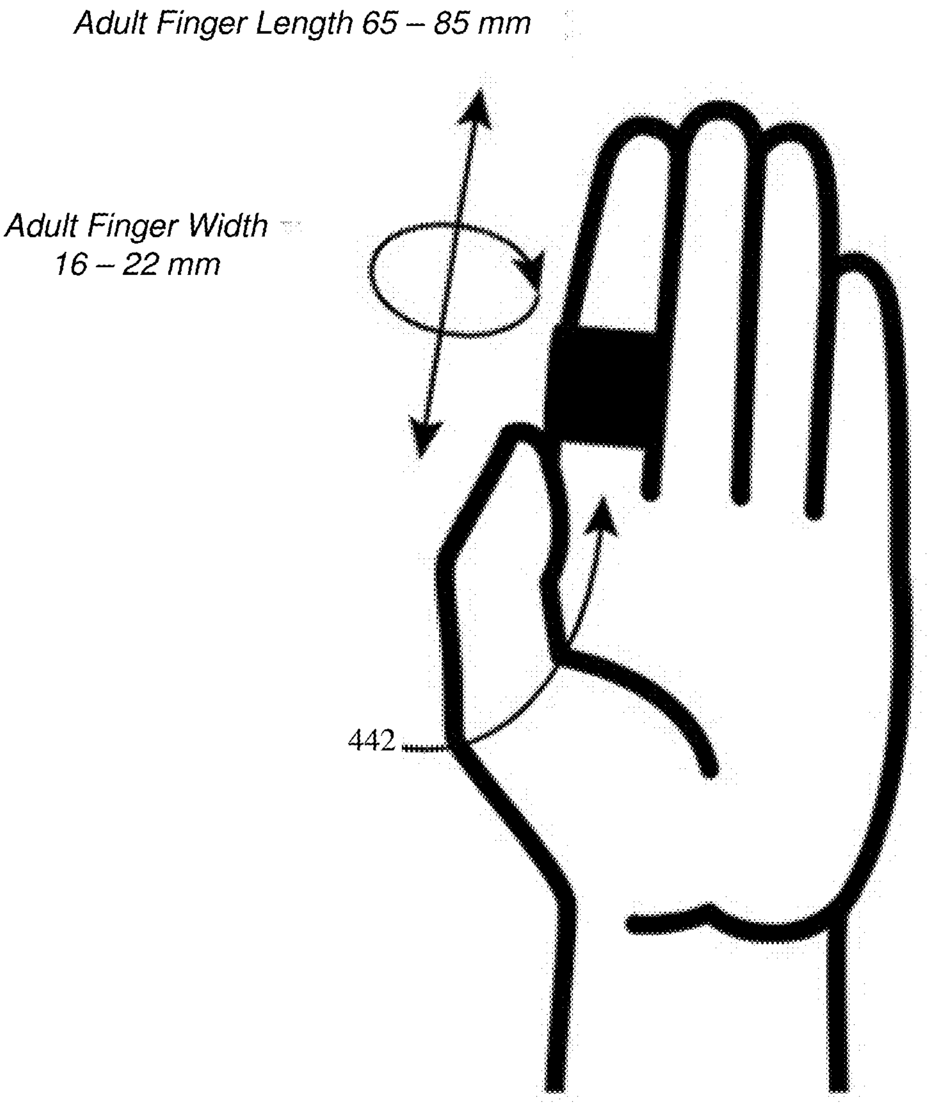
FIG. 5 is a representation of an example wearable device in the form of a ring design showing example dimensions, in accordance with various example embodiments and implementations of the subject disclosure.

In one example implementation, the metasurface is fabricated on flexible material (substrate and metallic ground plane) to facilitate forming the wearable device into a ring shape (FIG. 5) suitable for wearing on a human finger. The dimensions shown in FIGS. 4 and 5 are based on a typical adult finger size and a frequency of 80 gigahertz (GHz). The fabrication tolerance of the metasurface design described herein makes this design easily scalable up to sub-terahertz frequencies, which is suitable for miniaturization to fit on a ring. As shown in FIG. 4, each unit cell in this example measures 1.88 mm×1.88 mm. These unit cells can be arranged in a matrix to fit within a ring that measures 1.5 cm in width and 2 to 3 cm in length when flattened. Additionally, the design is conformal, allowing for adjustments to accommodate bending of the surface, ensuring both flexibility and functionality in wearable applications.

Figure 6A:
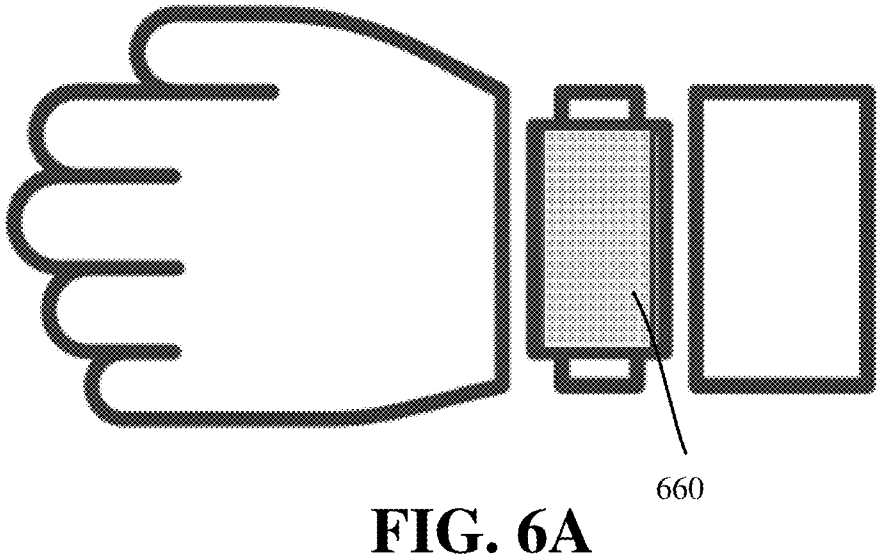
FIG. 6A is a representation of an example wearable device with a passive metasurface in the form of a wrist-wearable (e.g., wristband or bracelet) design, in accordance with various example embodiments and implementations of the subject disclosure.
Figure 6B:
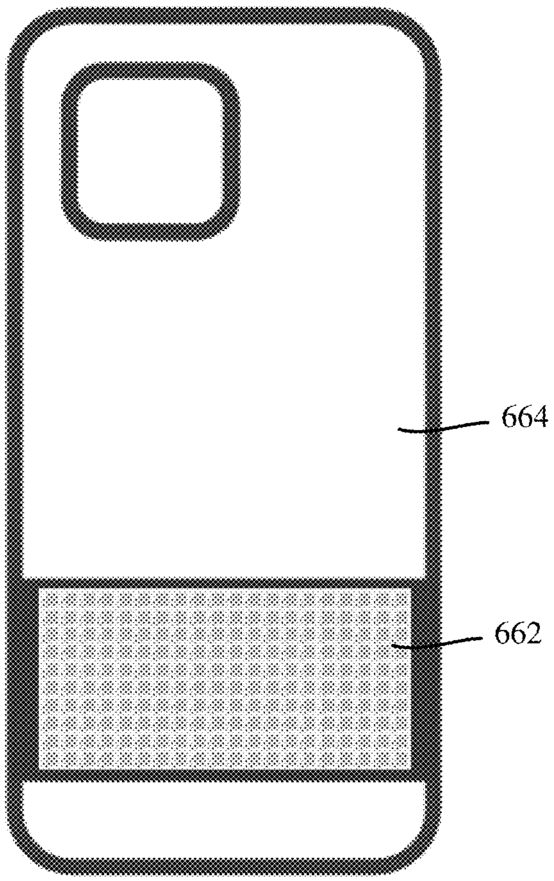
FIG. 6B is a representation of an example passive portable device with a passive metasurface in the form of a design for affixing to a personal item (e.g., cell phone), in accordance with various example embodiments and implementations of the subject disclosure.
Figure 7A:
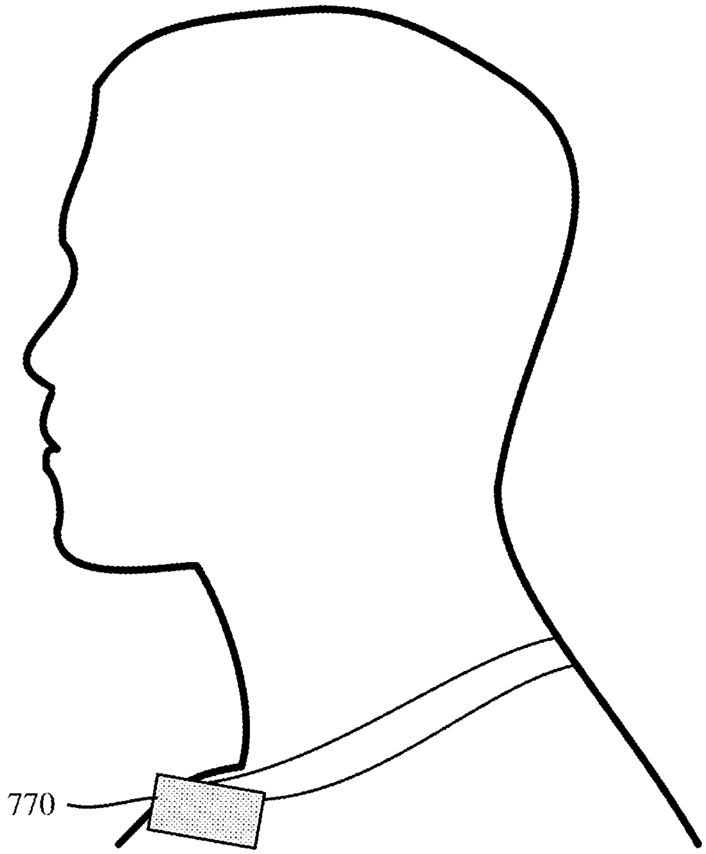
FIG. 7A is a representation of an example wearable device with a passive metasurface in the form of a neck-wearable (e.g., via a lanyard or necklace) design, in accordance with various example embodiments and implementations of the subject disclosure.
Figure 7B:
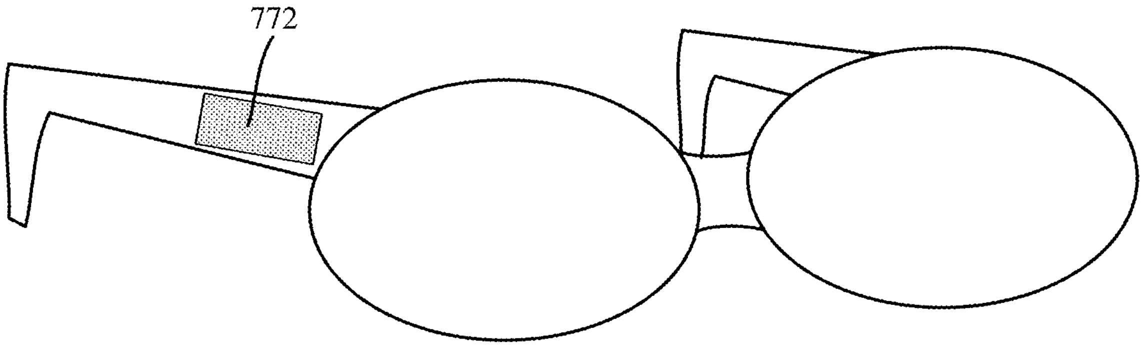
FIG. 7B is a representation of an example portable wearable device with a passive metasurface in the form of a design for affixing to a wearable item (e.g., eyeglass frames), in accordance with various example embodiments and implementations of the subject disclosure.

FIGS. 6A and 6B show alternative, non-limiting examples of wearable devices, namely a wrist-worn (e.g., wristband or bracelet) device 660, and a portable device 662 attached to a cell phone case 664. Although the portable device 662 attached to the cell phone case 664 is not "wearable" in the conventional sense, it can be considered "wearable" to the extent it accompanies a user and is typically part of the user's personal accoutrements that are generally within the user's possession, and indeed, can be "worn" in a user's pocket. FIGS. 7A and 7B show metasurfaces worn around a user's neck (e.g., as a necklace, locket or in lanyard) wearable device 770, and a wearable device 772 affixed to a user's eyeglass frame, respectively. Other non-limiting examples that are not explicitly shown include an identification badge, a name tag patch (e.g., affixed at a conference), a headset or headphones (e.g., regularly worn while working with a computer), and so on. Note that while the metasurface itself is passive, the metasurface can be coupled to a non-passive device, e.g., a watchband of a user's existing battery-powered wristwatch.

The metasurface size can be scaled based on the surface area of the wearable. The metasurface provides the flexibility to be embedded into a ring, a bracelet, a phone case, and many other daily devices worn or carried by a person, as described herein. The choice of the size of wearable metasurface depends on the user needs. Some example consideration factors when choosing among the wearable metasurface devices are summarized in the following table:

| User Needs | Product |
|---|---|
| Tranceiver Alignment | Ring |
| Gain | Wrist-worn Device |
| Convenience | Affixed/Embedded to Phone Case |

Factors influencing the size preference for the metasurface include alignment with the transceiver (orthogonality data), the desired signal gain, and the overall convenience and ergonomics of the wearable. This technology can adapt to a variety of wearable options, enabling users to select the type that best fits their lifestyle and requirements.

The metasurface shapes can be designed to leverage the manufacturers fabrication tolerances and, based on the unique physical ID (service tag in this case), each device has differences in shape of the unit-cells, different phase profile of the cells, spacing between the cells, beam length, beam splitting, and so forth. A combination of such variations can be used to create differences between device to not only avoid interference but also for security. A unique device ID and the wireless radiation pattern need to match for the device to work on a device, which makes it difficult for the hackers as the wireless patterns alone will not create the required device signature; instead, a combination of device ID and performance signature along with activation status are needed for use.

Figure 8A:
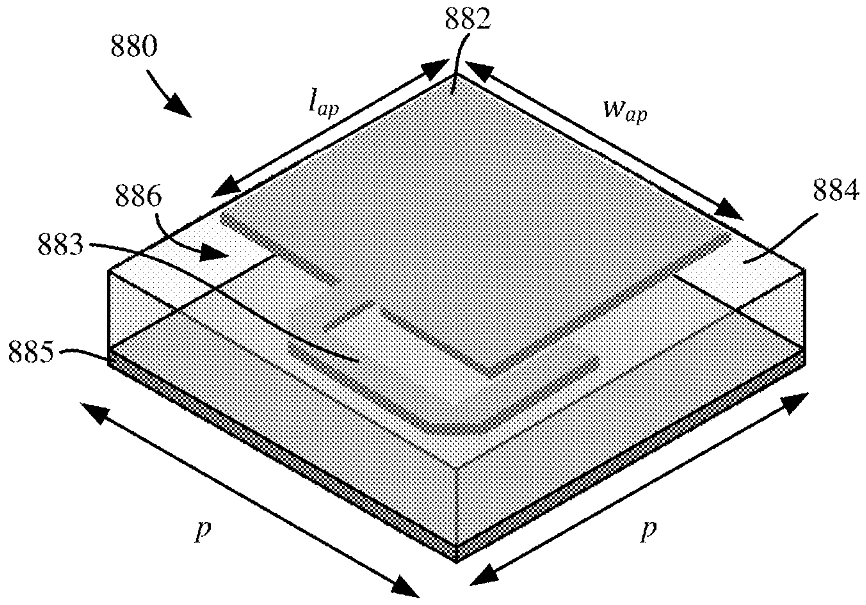
FIG. 8A is a three-dimensional perspective view representation of an example unit cell for a metasurface of a passive wearable device, in accordance with various example embodiments and implementations of the subject disclosure.

FIG. 8A shows a three-dimensional perspective view of one metasurface design 880 that includes a metallic patch element 882 and a metallic phase delay element 883. The metallic patch element 882 and the metallic phase delay element 883 are fabricated atop a substrate 884; a ground plane layer (panel) 885 beneath the substrate 884 in conjunction with the metallic patch element 882 provides an aperture 886 of length $l_{ap}$ and width $w_{ap}$ that facilitates passive operation of the unit cell 880. As is understood, an entire array of unit cells can be fabricated on a single substrate/ground plane.

Figure 8B:
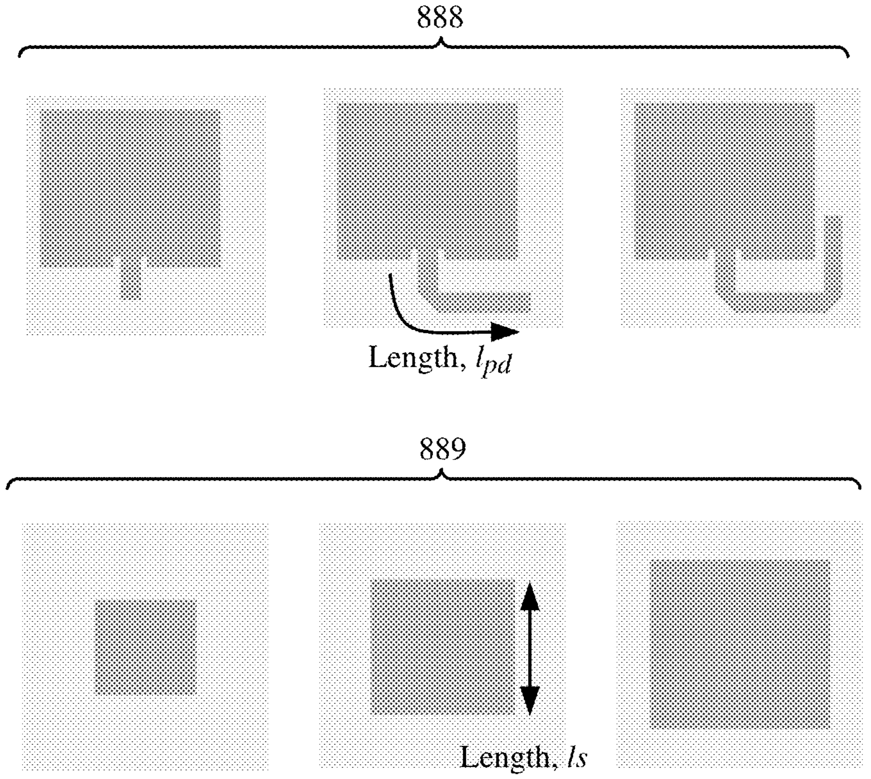
FIG. 8B is a representation of an example unit cell designs with geometry variations for different phase profiles, in accordance with various example embodiments and implementations of the subject disclosure.
Figure 9:
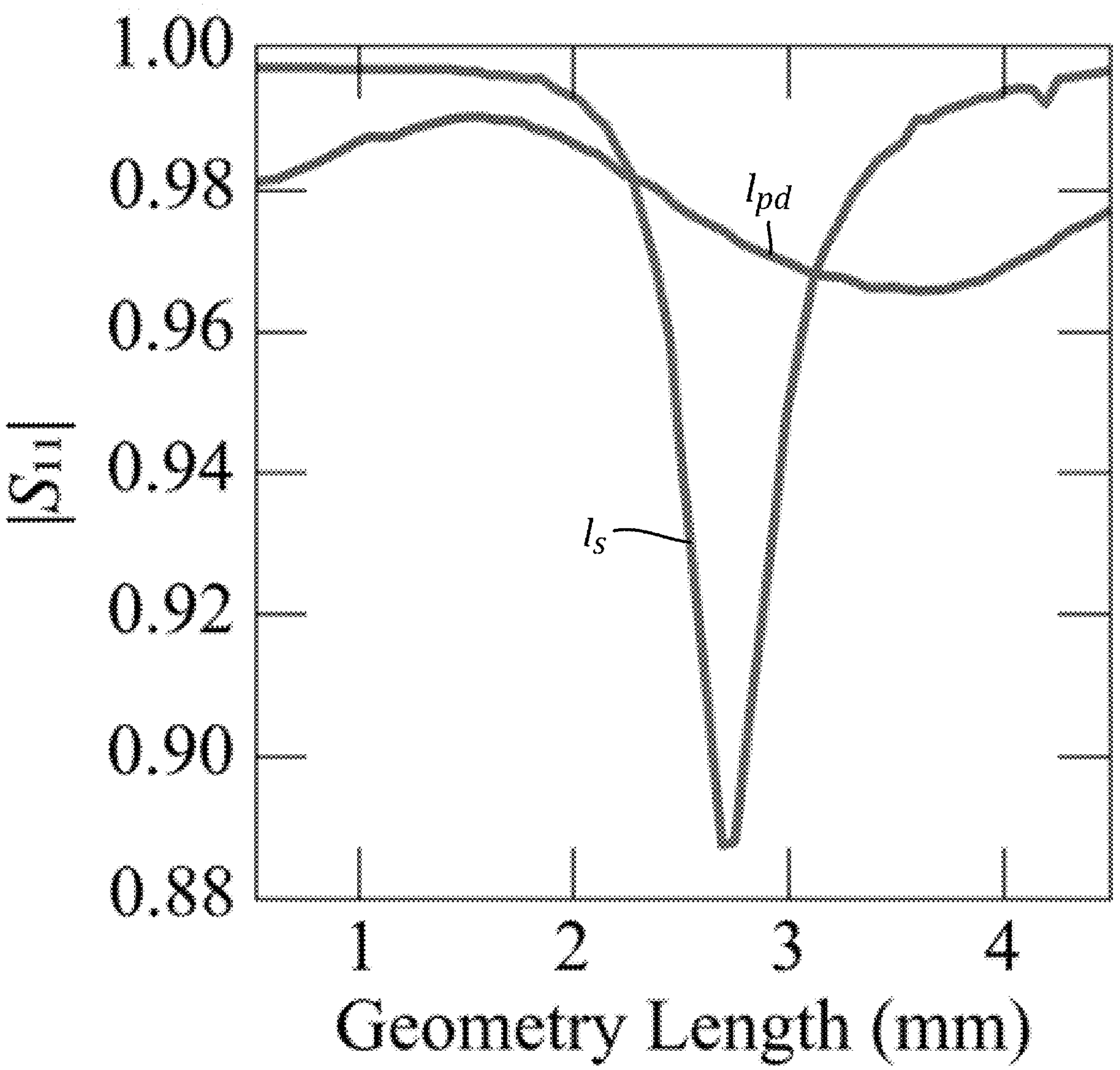
FIG. 9 is a graphical representation of geometry length versus signal reflection for example passive metasurface device designs, in accordance with various example embodiments and implementations of the subject disclosure.
Figure 10:
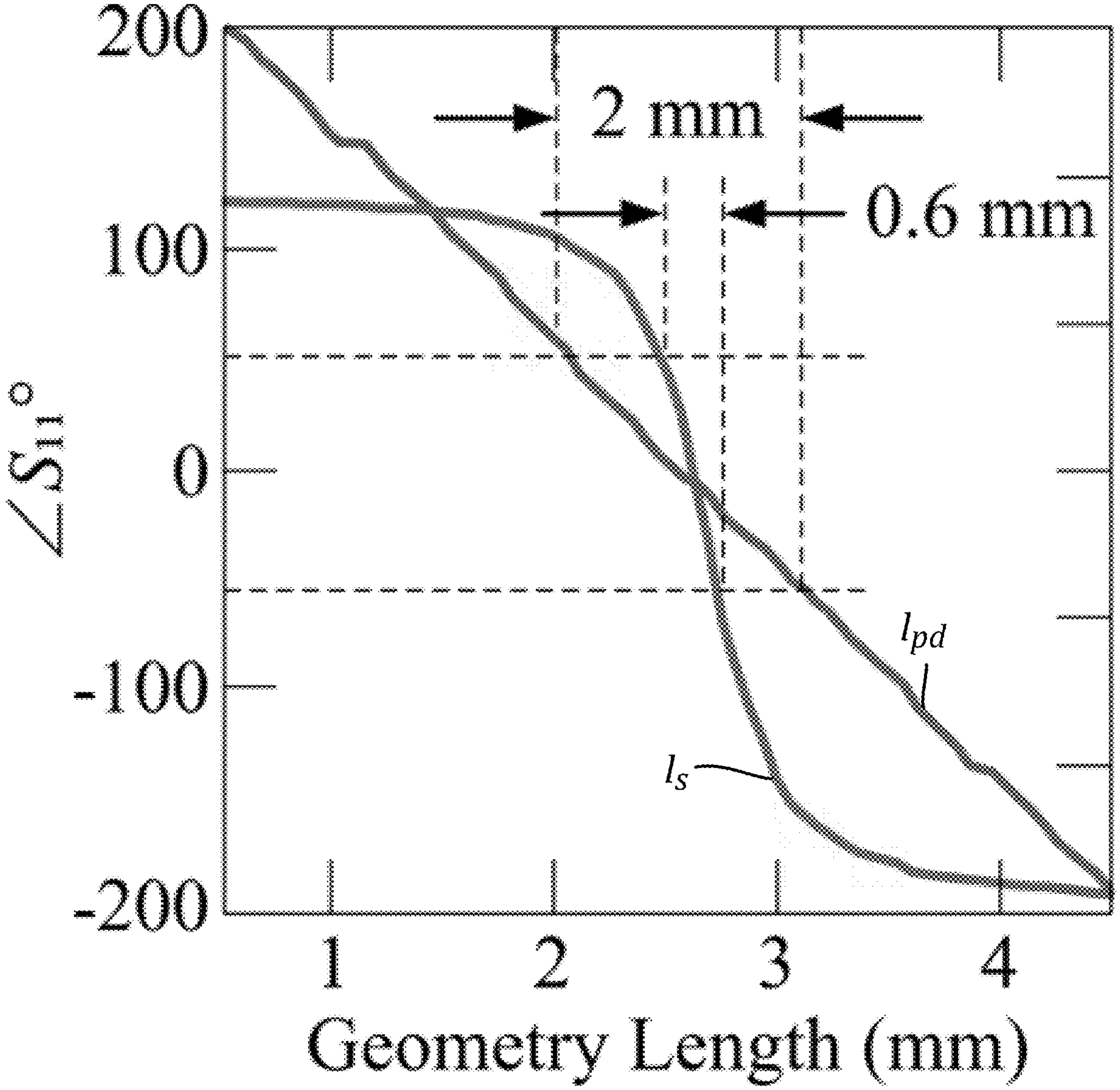
FIG. 10 is a graphical representation of geometry length versus signal reflection angle data for example passive metasurface device designs, in accordance with various example embodiments and implementations of the subject disclosure.

The length of the phase delay element 883 (i.e., metallic stub) adjusts the phase of the reflected signal. Such a phase delay element-based designs (888, FIG. 8B) overcome several challenges that regular variable-patch size approaches (889, FIG. 8B) encounter, as demonstrated by the simulation results shown in FIGS. 9 and 10. The simulation shows a full-wave numerical experiment result for an example unit-cell design using line-delay elements, which demonstrates phase delay element-based phase linearity compared to conventional size variation. The design was originally designed for 30 GHz, with $l_{ap}$=2.93 mm, $w_{ap}$=3.31 mm, and p=5.01 mm More particularly, FIGS. 9 and 10 highlight how the patch size variation approach designs 889 (without delay lines) suffer from phase errors, due to a combined effect of fabrication tolerance and the rapid phase variation near resonance. As shown in FIG. 10, the phase undergoes a 100 degree change within a mere 0.6 mm range. With typical fabrication tolerances between 0.07 to 0.20 mm (3-8 mil), this design is prone to phase errors, particularly at higher frequencies and/or when using cost-effective, lower precision manufacturing techniques. In contrast, the phase delay element designs 888 (FIG. 8B) with delay lines exhibit a flatter amplitude profile and a linear phase trend, as also shown in FIGS. 9 and 10, respectively. The phase shift with the phase delay element design approach 888 is proportional to twice the line length, offering significantly more reliable and consistent performance.

The phase delay element implementation design is appropriate for high frequency operation in that the design reduces the physical size and minimizes interference. More particularly, a metasurface design uses the phase delay element for tuning reflected signals' phase for high frequency operation, which enhances device compactness, aesthetic integration, and reduces interference by avoiding crowded spectral bands. At the same time, the design facilitates straightforward fabrication with the metallic patch element and phase delay element with a conformal design for versatile integration. Designing the length of the phase delay element for tuning not only eases the manufacturing process, but also significantly enhances the fabrication tolerances, which can significantly reduce barriers to innovation and deployment. The metasurface design's conformal nature is beneficial in wearable technology.

A wearable device can have information encoded into its reflected signal based on how the reflected signal is altered by the metasurface relative to the transmitted signal. More particularly, any device can be crafted with a distinct metasurface pattern that distinguishes that metasurface from others. The distinct identifiability of each device is based on its physical radiation characteristics, in that each metasurface can generate a distinct radiation pattern in the reflected signal, which differentiates each such metasurface while ensuring that each metasurface can uniquely interact with the corresponding system.

Figure 11A:
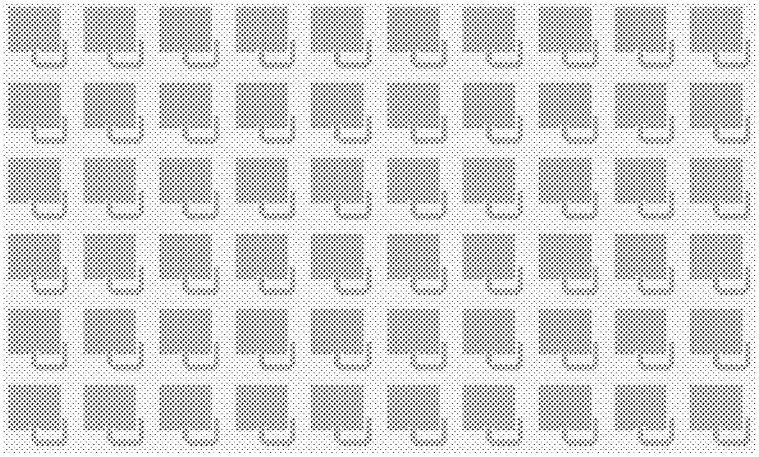
FIGS. 11A-11C are representations of example metasurfaces with various different design parameters to create distinct per device signatures, in accordance with various example embodiments and implementations of the subject disclosure.
Figure 11B:
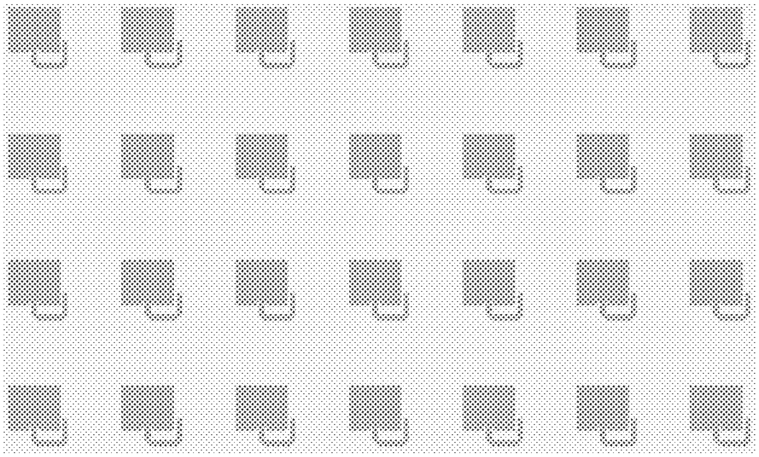
Figure 11C:
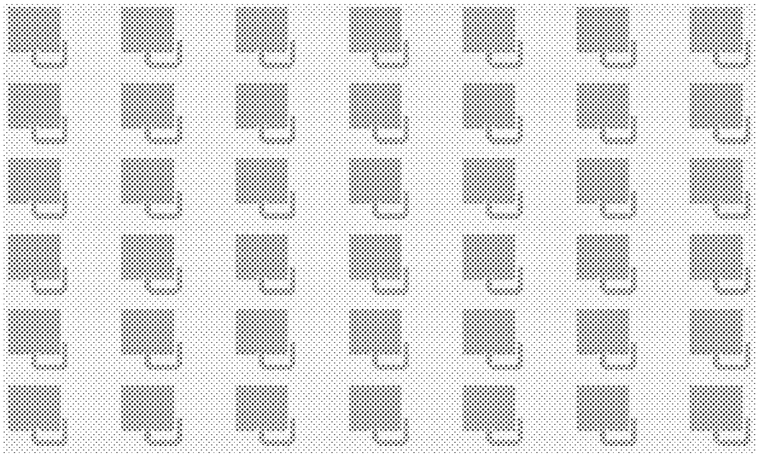

To this end, each device can be manufactured with a system-unique set of metasurface scatters (or simply unit-cells) to provide variations in terms of phase, gain, beam patterns, dual beam splitting, directivity, and the like which can be achieved by altering the unit-cell shape, phase, size, spacing, rotation, among other characteristics, as shown in FIGS. 11A-11C; the characteristics can be unique and randomized/or altered according to a controlled pseudorandom pattern. For example, the example metasurface of FIG. 11A can be considered a standard metasurface, while the more spaced-apart unit cells of FIG. 11B (relative to FIG. 11A) can provide a variation on the beam width. The horizontal spacing and vertical spacing differences in FIG. 11C can result in asymmetric beam splitting based on grating lobes (resulting in variations on the number of reflected beams and their angles).

An advantageous characteristic of the wearable technology described herein is the scalable design of the metasurface, which can be adapted to fit various sizes and types of wearables. The flexibility to customize the size of the metasurface based on the surface area of the wearable item enables a tailored approach to meet specific user needs. Further, as described with refence to FIGS. 11A-11C, there can be a distinct per-device performance signature, possibly globally unique, by which each device is manufactured with a different set of metasurface scatters (i.e., unit-cells) to provide variations in terms of phase, gain, beam patterns, multiple (e.g., dual) beam splitting, directivity and the like, which can be achieved by altering the unit-cell shape, phase, size, spacing, rotation and so forth.

This distinct performance signature can be linked to a system-unique device ID, in which the system expects to detect the predetermined performance signature when the wearable device is linked to the user's computing device and/or associated account. For example, the wearable device-related logic 116 (FIG. 1A) or 117 (FIG. 1B) can look for an expected radiation pattern and match it to a user account; if not matched, or no signal is reflected, metasurface-based access is denied, although another way to access the account may be enabled, such as if the user has forgotten to wear the device. There also can be shared access to a computing device, and thus the logic can map one radiation pattern signature to one authorized user of that computing device and to that user's profile/account, and map a different radiation pattern signature to another authorized user of that computing device and to that other user's profile/account.

Among the benefits of distinct metasurfaces and their corresponding distinct physical radiation patterns is with respect to integrated physics device identification for remote management of wearable metasurfaces. A concern regarding the security of a system as described herein is to ensure that only a specific, authorized wearable device can unlock the system/account, rather than just any wearable device. To address this, each device can be crafted with a different metasurface pattern that distinguishes it from others.

Figure 12A:
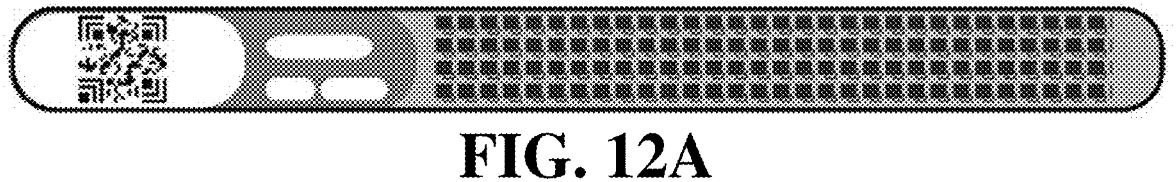
FIG. 12A is a representation of an example wearable device in which a distinct device physical radiation pattern signature is included in a device service tag, in accordance with various example embodiments and implementations of the subject disclosure.

The distinct identifiability via customized radiation characteristics also facilitates the association of a service tag encoding for individual metasurface identification. By way of example, consider that the customized radiation characteristics can encode/correspond to a number of (e.g., seven) alphanumeric characters, that encode the specific differences in each metasurface's design, such as appearance, materials, location, antenna patterns, beam splitting nature, range, and so forth. Individual performance parameters can be encoded as well. An example metasurface with an associated service tag that is also encoded in the customized radiation characteristics is shown in FIG. 12A.

This customization involves distinct radiation patterns generated by each metasurface, tailored specifically to each device ID. This device ID can be incorporated or encrypted within an enterprise's service tag mechanism. For example, because peripherals do not need a separate service tag, a device ID in case of a wearable device is desirable to distinguish the physical features, internal metasurface design patterns, beam patterns, materials, location, and in general for remote management, including activation of the device when purchasing or deactivation in case if the device gets lost.

With respect to improved security and privacy, leveraging the distinct signal manipulation capabilities of metasurfaces, the technology described herein offers an advanced level of security. The complexity and customization potential of the reflected signals make it extremely challenging for unauthorized entities to mimic or hack. Indeed, the different characteristics of each ring or wearable device, achieved through specific customization of the radiation characteristics, can include the beam width (angular scan range) and the asymmetric beam splitting, which varies according to the number of beams and their specific angles. This ensures that each ring interacts individually with the system, providing a secure and personalized method of access.

Figure 12B:
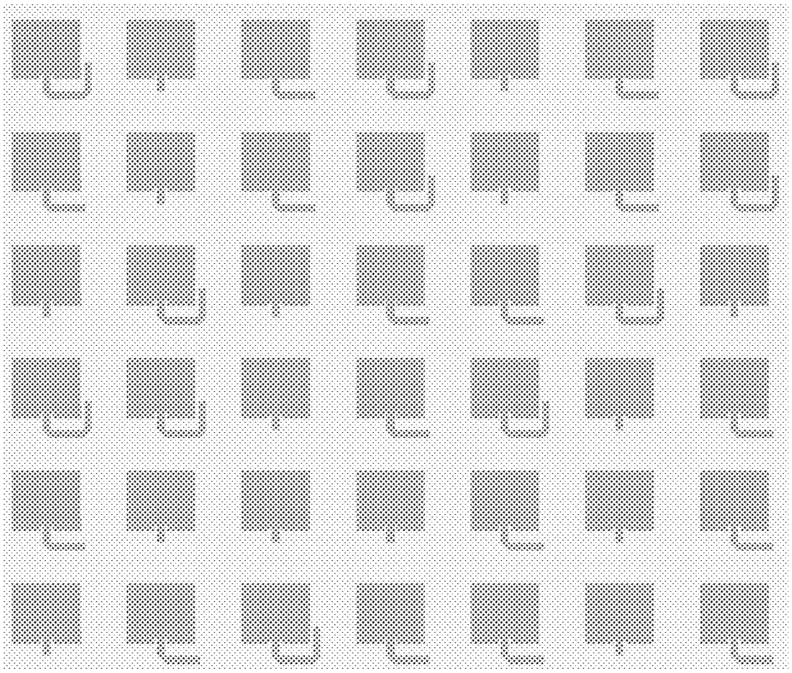
FIG. 12B is a representation of example unit cell designs with different length delay lines (stubs) arrayed for a distinct phase profile, in accordance with various example embodiments and implementations of the subject disclosure.
Figure 12C:
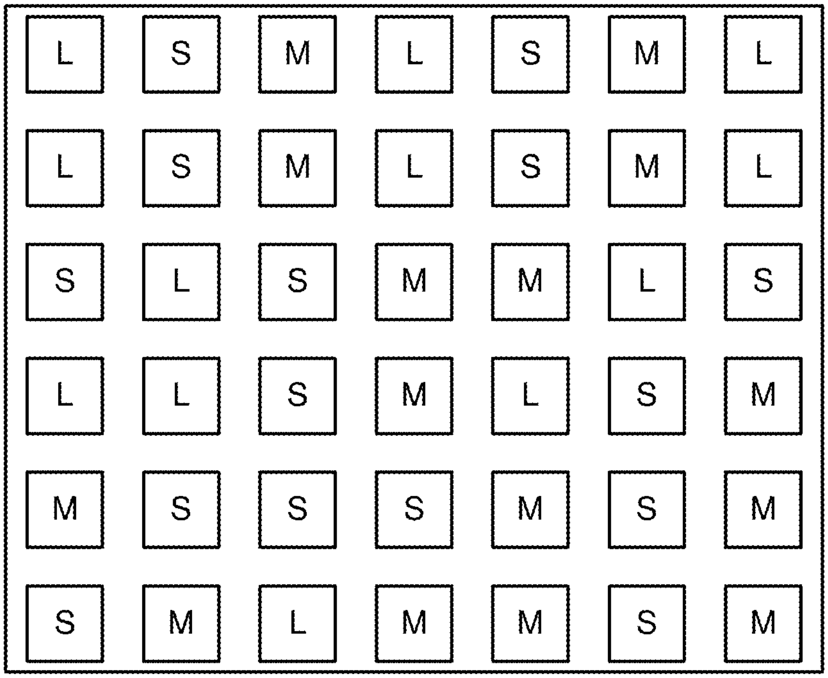
FIG. 12C is a representation of a map of the example unit cell designs with different length delay lines of FIG. 12A, in accordance with various example embodiments and implementations of the subject disclosure.

As a further example, in addition to the spacing differences described with reference to FIGS. 11A-11C, consider the different patterns of unit cell delay line (stub) lengths shown in FIG. 12B. FIG. 12C shows a map of the lengths, e.g., S (short), M (medium) and L (long) which can be distinctly arranged per metasurface. The pattern of the length arrangements of FIG. 12B, which results in one particular phase profile, can be varied for another device, and so on, providing another variable characteristic that modifies the physical radiation pattern of the reflected signal relative to the transmitted signal. Note that while three different delay line lengths are depicted, there can be more than three different lengths, providing even more variations in phase profiles among metasurfaces.

Figure 13:
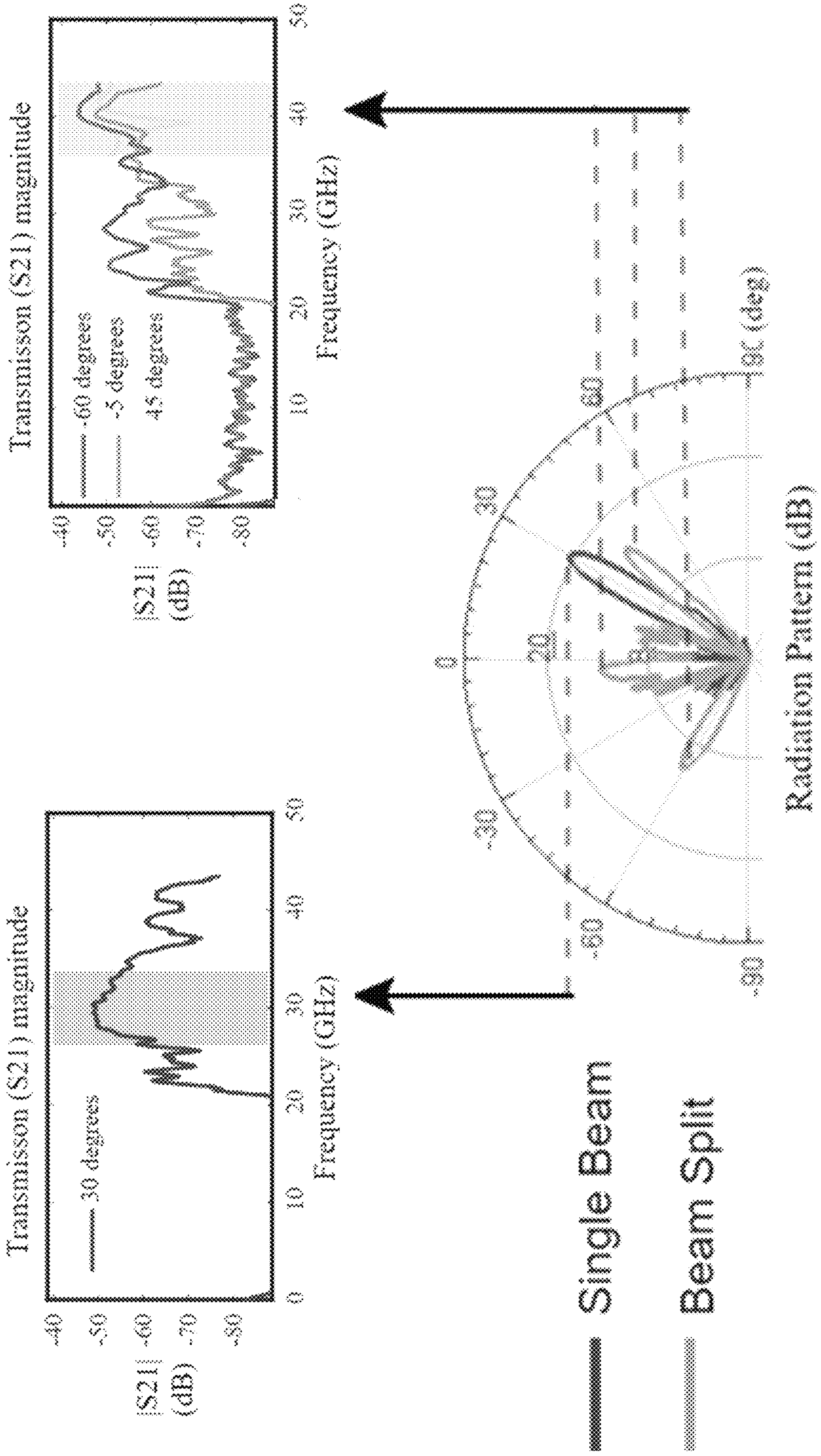
FIG. 13 is a graphical representation of different radiation patterns achieved from an example grating lobe-based beam-splitting metasurface, demonstrating the capability for a single reflected beam or a split beam from a wearable device with a passive metasurface, in accordance with various example embodiments and implementations of the subject disclosure.

FIG. 13 shows a different radiation pattern achieved from a metasurface configured for beam splitting. The frequency is tunable based on the metasurface unit cell size.

One or more example embodiments can be embodied in a device, such as described and represented herein. The device can include a passive metasurface comprising respective unit cells; the passive metasurface can be configured to redirect transmitted wireless radio frequency signals, received at the metasurface from a transmitter, as redirected wireless radio frequency signals to a receiver. The respective unit cells are configured with at least one distinct physical characteristic to redirect the redirected wireless radio frequency signal with a distinct physical radiation pattern relative to other physical radiation patterns of other metasurfaces for identification of the metasurface relative to the other metasurfaces.

At least one distinct physical characteristic can include respective shapes of the respective unit cells.

At least one distinct physical characteristic can include respective sizes of the respective unit cells.

At least one distinct physical characteristic can include respective rotation angles of the respective unit cells.

At least one distinct physical characteristic can include respective spacing distances between the respective unit cells.

At least one distinct physical characteristic can correspond to a distinct phase profile of the redirected wireless radio frequency signal.

At least one distinct physical characteristic can correspond to distinct beam length data of the redirected wireless radio frequency signal.

At least one distinct physical characteristic can correspond to distinct beam width data of the redirected wireless radio frequency signal.

At least one distinct physical characteristic can correspond to distinct beam splitting data of the redirected wireless radio frequency signal.

The metasurface can be part of a service tag associated with an electronic device.

The metasurface can be part of a wearable device.

The metasurface can be coupled to a movable device.

One or more example embodiments can be embodied in a metasurface, such as described and represented herein. The metasurface can include respective unit cells configured to reflect a transmitted wireless signal as a reflected wireless signal to a receiver. The reflected wireless signal can be altered, relative to the transmitted wireless signal, by the respective unit cells based on respective physical characteristic data of the respective unit cells, into a distinct radiation pattern signature by which the metasurface can be identifiable from at least one other metasurface.

The respective physical characteristic data of the respective unit cells can include at least one of: respective shape data of the respective unit cells, respective size data of the respective unit cells, respective rotation angle data of the respective unit cells, or respective spacing distance data between the respective unit cells.

The distinct radiation pattern signature can correspond to at least one of: distinct phase profile data of the redirected wireless radio frequency signal, distinct beam length data of the redirected wireless radio frequency signal, distinct beam width data of the redirected wireless radio frequency signal, distinct beam splitting data of the redirected wireless radio frequency signal, distinct gain data of the redirected wireless radio frequency signal, or distinct directivity data of the redirected wireless radio frequency signal.

The metasurface can be part of a service tag associated with an electronic device, can be part of a human-wearable device, or can be attachable to a movable device.

Figure 14:
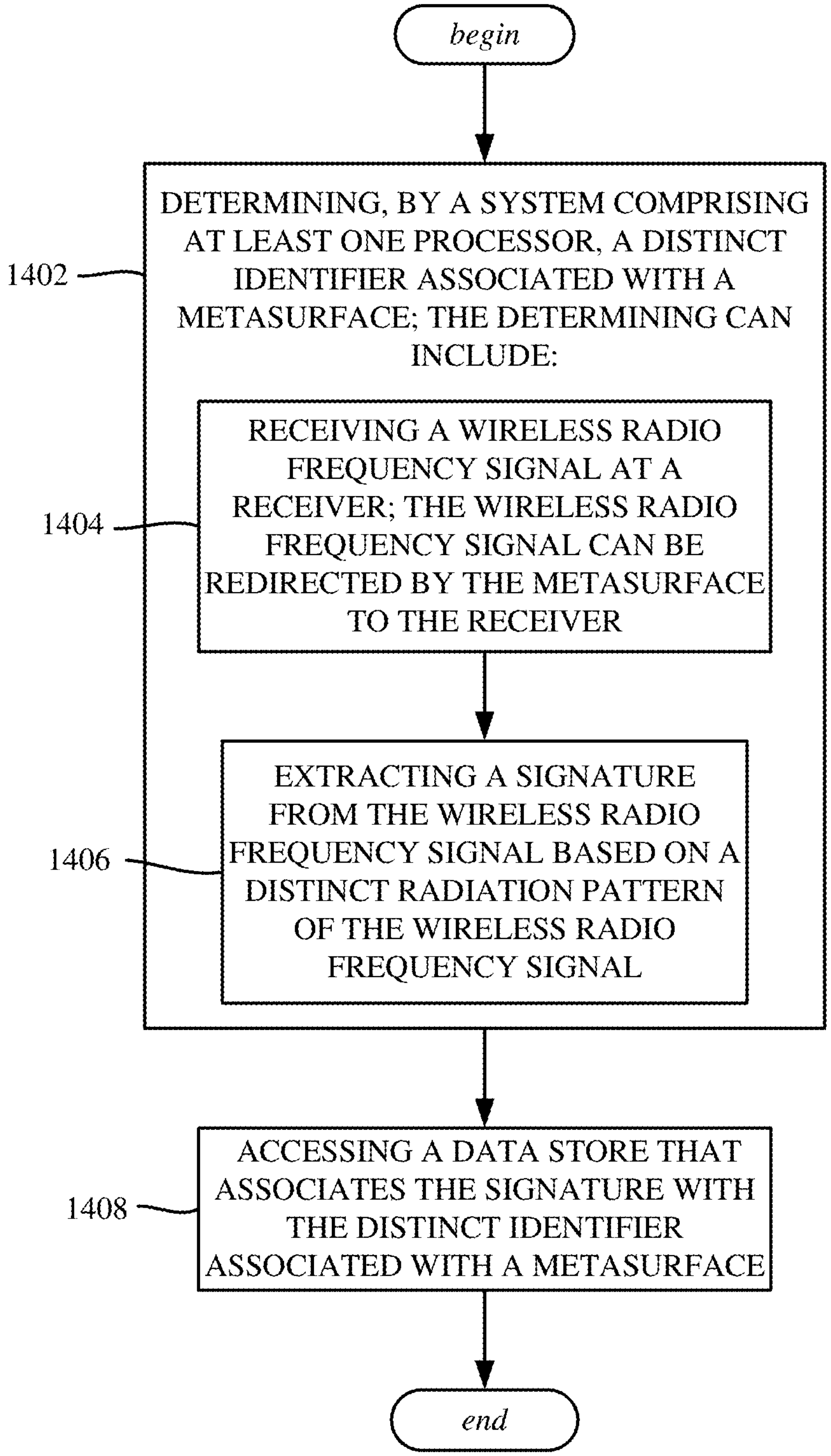
FIG. 14 is a flow diagram showing example operations related to extracting a signature from a wireless radio frequency signal based on a distinct radiation pattern of the wireless radio frequency signal, in accordance with various example embodiments and implementations of the subject disclosure.

One or more example implementations and/or embodiments, such as corresponding to example operations of a method, or a system/a machine-readable medium having executable instructions that, when executed by a processor, facilitate performance of the operations, are represented in FIG. 14. Example operation 1402 represents determining, by a system comprising at least one processor, a distinct identifier associated with a metasurface, the determining can include example operations 1404 and 1406. Example operation 1404 represents receiving a wireless radio frequency signal at a receiver; the wireless radio frequency signal can be redirected by the metasurface to the receiver. Example operation 1406 represents extracting a signature from the wireless radio frequency signal based on a distinct radiation pattern of the wireless radio frequency signal. Example operation 1408 represents accessing a data store that associates the signature with the distinct identifier associated with the metasurface.

18. The method of claim 18, wherein the extracting of the signature from the wireless radio frequency signal can include recognizing at least one of: distinct phase profile data of the redirected wireless radio frequency signal, distinct beam length data of the redirected wireless radio frequency signal, distinct beam width data of the redirected wireless radio frequency signal, or distinct beam splitting data of the redirected wireless radio frequency signal, distinct gain data of the redirected wireless radio frequency signal, or distinct directivity data of the redirected wireless radio frequency signal.

19. The method of claim 18, further comprising taking action, by the system, based on the identifier of the metasurface.

20. The method of claim 19, wherein the taking of the action can include linking the metasurface to an account, or unlocking an electronic device associated with the metasurface.

As can be seen, the technology described herein is directed to user wearable/portable devices designed with a distinct physical radiation patter/signature that facilitates remote management of the device. Remote management can include activation or deactivation with respect to device/account access via the metasurface. When activated, the wearable/portable devices can be used for proximity detection and/or seamless authentication on digital computing devices such as a laptop/desktop PC. The technology described herein is implemented through a passive metasurface, to enhance personal security and facilitate seamless interaction with digital environments. Metasurfaces, being engineered interfaces, manipulate electromagnetic waves in ways that traditional materials cannot, without requiring any power source, making them very suitable for passive operations in wearable technology, as well as facilitating distinct radiation patters per metasurface.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A device, comprising:

a passive metasurface comprising respective unit cells, the passive metasurface configured to redirect transmitted wireless radio frequency signals, received at the passive metasurface from a transmitter, as redirected wireless radio frequency signals to a receiver, wherein the respective unit cells are configured with at least one distinct physical characteristic to redirect the transmitted wireless radio frequency signals with a distinct per-device physical radiation pattern relative to other physical radiation patterns of other metasurfaces, wherein the distinct per-device physical radiation pattern corresponds to a distinct per-device performance signature that is linked to a system-unique device identifier, and wherein the distinct per-device physical radiation pattern is employable for identification of the passive metasurface relative to the other metasurfaces, and to control access to another device, other than the device and associated with the passive metasurface, based on the distinct per-device performance signature.

2. The device of claim 1, wherein the at least one distinct physical characteristic comprises respective shapes of the respective unit cells.

3. The device of claim 1, wherein the at least one distinct physical characteristic comprises respective sizes of the respective unit cells.

4. The device of claim 1, wherein the at least one distinct physical characteristic comprises respective rotation angles of the respective unit cells.

5. The device of claim 1, wherein the at least one distinct physical characteristic comprises respective spacing distances between the respective unit cells.

6. The device of claim 1, wherein the at least one distinct physical characteristic corresponds to a distinct phase profile of a redirected wireless radio frequency signal of the redirected wireless radio frequency signals.

7. The device of claim 1, wherein the at least one distinct physical characteristic corresponds to distinct beam length data of a redirected wireless radio frequency signal of the redirected wireless radio frequency signals.

8. The device of claim 1, wherein the at least one distinct physical characteristic corresponds to distinct beam width data of a redirected wireless radio frequency signal of the redirected wireless radio frequency signals.

9. The device of claim 1, wherein the at least one distinct physical characteristic corresponds to asymmetric distinct beam splitting data of a redirected wireless radio frequency signal of the redirected wireless radio frequency signals based on grating lobes.

10. The device of claim 1, wherein the passive metasurface is part of a service tag associated with the device, wherein the service tag encodes the distinct per-device performance signature and the system-unique device identifier for remote management of the device.

11. The device of claim 1, wherein the device is a wearable device.

12. The device of claim 1, wherein the device is a movable device.

13. A metasurface, comprising:

respective unit cells configured to reflect a transmitted wireless signal as a reflected wireless signal to a receiver, wherein the reflected wireless signal is altered, relative to the transmitted wireless signal, by the respective unit cells based on respective physical characteristic data of the respective unit cells, into a distinct per-device radiation pattern by which the metasurface is identifiable from at least one other metasurface, wherein the distinct per-device radiation pattern corresponds to a distinct per-device performance signature that is linked to a system-unique device identifier, and herein the distinct per-device radiation pattern is employable to control access to a device associated with the metasurface based on the distinct per-device performance signature.

14. The metasurface of claim 13, wherein the respective physical characteristic data of the respective unit cells comprises at least one of: respective shape data of the respective unit cells, respective size data of the respective unit cells, respective rotation angle data of the respective unit cells, or respective spacing distance data between the respective unit cells.

15. The metasurface of claim 13, wherein the distinct per-device radiation pattern corresponds to at least one of: distinct phase profile data of the reflected wireless signal, distinct beam length data of the reflected wireless signal, distinct beam width data of the reflected wireless signal, distinct beam splitting data of the reflected wireless signal, distinct gain data of the reflected wireless signal, or distinct directivity data of the reflected wireless signal.

16. The metasurface of claim 13, wherein at least one of:

the metasurface is part of a service tag associated with the device, wherein the service tag encodes the distinct per-device performance signature and the system-unique device identifier for remote management of the device;

the device is a human-wearable device; or the device is a movable device.

17. A method, comprising:

determining, by a system comprising at least one processor, a distinct identifier associated with a metasurface, the determining comprising:

receiving a redirected wireless radio frequency signal at a receiver, wherein the redirected wireless radio frequency signal is redirected by the metasurface to the receiver, and extracting a signature from the redirected wireless radio frequency signal based on a distinct per-device radiation pattern of the redirected wireless radio frequency signal, the signature comprising a distinct per-device performance signature corresponding to customized physical radiation characteristics of the metasurface;

accessing, by the system, a data store that associates the signature with the distinct identifier associated with the metasurface; and controlling, by the system, access to a device associated with the metasurface based on the signature.

18. The method of claim 17, wherein the extracting of the signature from the redirected wireless radio frequency signal comprises recognizing at least one of: distinct phase profile data of the redirected wireless radio frequency signal, distinct beam length data of the redirected wireless radio frequency signal, distinct beam width data of the redirected wireless radio frequency signal, or asymmetric distinct beam splitting data of the redirected wireless radio frequency signal based on grating lobes, distinct gain data of the redirected wireless radio frequency signal, or distinct directivity data of the redirected wireless radio frequency signal.

19. The method of claim 17, further comprising taking action, by the system, based on the distinct identifier of the metasurface and the distinct per-device performance signature.

20. The method of claim 19, wherein the taking of the action comprises at least one of linking the metasurface to an account associated with the device, or unlocking the device associated with the metasurface.

* * * * *